United States Patent [19]

Tsubai et al.

[11] 4,376,157

[45] Mar. 8, 1983

[54] PHOTOGRAPHIC MATERIALS WITH TWO-DIMENSIONALLY DISTRIBUTED PRECIPITATION NUCLEI

[75] Inventors: Yasuo Tsubai; Yoshikazu Takaya; Takao Senga, all of Nagaokakyo, Japan

[73] Assignee: Mitsubishi Paper Mills, Ltd., Tokyo, Japan

[21] Appl. No.: 245,548

[22] Filed: Mar. 19, 1981

[30] Foreign Application Priority Data

Mar. 26, 1980 [JP] Japan ................................ 55/38542

[51] Int. Cl.³ ........................ G03C 5/54; G03C 1/48; B32B 5/16; B32B 9/00

[52] U.S. Cl. .................................. 430/229; 430/231; 430/232; 430/247; 428/328; 428/332; 428/338; 428/327

[58] Field of Search ............... 430/231, 232, 247, 229; 428/538, 539, 328, 338, 332, 327; 427/437

[56] References Cited

U.S. PATENT DOCUMENTS

| | | | |
|---|---|---|---|
| 3,234,022 | 2/1966 | Land et al. | 430/231 |
| 3,424,580 | 1/1969 | Wainer | 430/231 |
| 3,511,656 | 5/1970 | Regan et al. | 430/231 |
| 3,516,827 | 6/1970 | Schrock et al. | 430/231 |
| 3,600,185 | 8/1971 | McGuckin | 430/231 |
| 3,628,978 | 12/1971 | Yackel et al. | 430/231 |
| 3,740,220 | 6/1973 | DeHaes | 430/231 |
| 4,025,343 | 5/1977 | Levy | 430/231 |

*Primary Examiner*—Richard L. Schilling

*Attorney, Agent, or Firm*—Cushman, Darby & Cushman

[57] ABSTRACT

Transfer images of high contrast, high density and high sharpness can be obtained by DTR process wherein all of the physical development nucleus particles are covered with a water permeable colloid having a thickness of at least 10 times the average diameter of the nucleus particles and all of the physical development nucleus particles are substantially two-dimensionally distributed at such intervals as capable of forming a continuous transfer developed silver.

13 Claims, 3 Drawing Figures

PHOTOGRAPHIC MATERIALS WITH TWO-DIMENSIONALLY DISTRIBUTED PRECIPITATION NUCLEI

BACKGROUND OF THE INVENTION

This invention relates to a method for producing images and more particularly to the silver complex diffusion transfer process, photographic materials for use in such process and method for producing same.

In more detail, it is concerned with a method for producing images of high density with an extremely small amount of silver halide and materials for use in such method.

The principle of the silver complex diffusion transfer process (DTR process) is described in U.S. Pat. No. 2,352,014 and is known.

According to the DTR process, a silver complex salt is imagewise transferred by diffusion from silver halide emulsion layer into image receiving layer, where it is converted to a silver image usually in the presence of physical development nuclei. For this purpose, a silver halide emulsion layer imagewise exposed is arranged or brought in contact with an image receiving layer in the presence of a developing agent and a silver halide complexing agent to convert unexposed silver halide to a soluble silver complex salt.

At the exposed areas of the silver halide emulsion layer the silver halide is developed (chemical development) and so is no longer dissolved and cannot diffuse.

At the unexposed areas of the silver halide emulsion layer the silver halide is converted to a soluble silver complex salt and is transferred into the receiving layer, where it forms a silver image usually in the presence of physical development nuclei.

The actions of silver halides at exposed and unexposed areas are opposite in direct positive silver halide emulsions.

The DTR process may be applied to various uses such as reproduction of documents, making of block copying material, instantaneous photographs, etc.

As mentioned above, the DTR process includes the so-called "two-sheet" type where silver halide emulsion layer and image receiving layer are provided on separate supports and they are brought in contact with each other at the time of diffusion transfer development to produce silver image in the image receiving material and the so-called "mono-sheet" type where the emulsion layer and the image receiving layer are provided on a same support usually in contact with each other. Both types may be used for block copying materials.

Generally, the light sensitive materials used for the DTR process contain a relatively small amount of silver as compared with those used for the ordinary chemical development. Even so, actually, the amount of silver used reaches about 8–15 millimols or more per 1 $m^2$ of the light sensitive materials so as to obtain high density and to assure and retain the various characteristics as commercial products demanded by users, e.g., high contrast, high sharpness, etc. It has been generally difficult to reduce the amount of silver to less than half of said amount.

However, effective utilization of resources has been demanded not only in Japan which is poor in resources, but on a worldwide scale and photographic techniques which require silver in an amount as small as possible have been desired from the point of economy, too.

SUMMARY OF THE INVENTION

The object of this invention is to provide diffusion transfer materials which can produce images of high density, high contrast and high sharpness with use of a very small amount of silver.

Another object of this invention is to provide a method for producing images by the DTR process by which images of high density, high contrast and high sharpness can be obtained with use of silver in a very small amount of 4 millimols or less per 1 $m^2$ of light sensitive materials.

DESCRIPTION OF THE INVENTION AND PREFERRED EMBODIMENT

Figure 1:
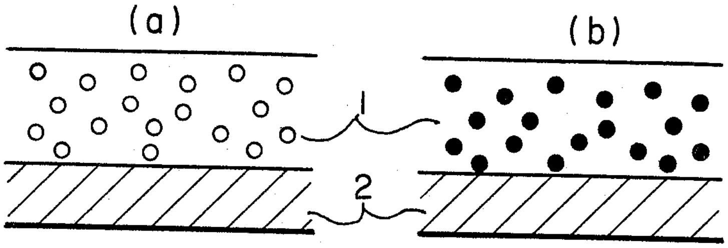
FIG. 1 is a diagrammatic enlarged cross-sectional view of the conventional image receiving material and FIG. 2 and FIG. 3 are diagrammatic enlarged cross-sectional view of the image receiving material and mono-sheet type material according to this invention, respectively.

This invention relates to materials for use in the silver complex diffusion transfer process which have a water permeable colloid layer containing physical development nucleus particles wherein all particles of said physical development nucleus are covered with a water permeable colloid having a thickness of at least 10 times the average particle diameter of said physical development nucleus particles and all of said physical development nucleus particles are distributed in substantially two-dimensional state at such intervals that one continuous transfer developed silver can be produced and it relates to a method for producing images using said materials.

This invention will be specifically explained below.

The image receiving materials in the two-sheet type materials for the DTR process or photographic materials used for producing originals of prints as intermediate step of plate making such as photocomposing paper, lith films, the so-called block copying materials require images of high density, high contrast and high sharpness and so require silver in an amount more than a specific amount as mentioned hereinbefore.

The conventional image receiving materials comprise a support on which is coated at a thickness of several microns a dispersion of physical development nucleus fine particles such as sulfides or selenides of metals such as silver, gold, platinum, palladium, cadmium, zinc, nickel, cobalt, lead, copper, etc. or noble metals in a water permeable colloid such as gelatin, polyvinyl alcohol, ethylene-maleic anhydride copolymer, carboxymethylcellulose, sodium alginate, etc. at a suitable concentration. In such conventional image receiving materials, transferred silver density decreases in proportion to decrease of the amount of silver in light sensitive materials. Therefore, when the amount of silver is less than 4 millimols, especially less than 3 millimols (0.51 g/$m^2$ as silver nitrate) per 1 $m^2$ of light sensitive materials, it is extremely difficult to obtain photographic materials which require images of high density, high contrast and high sharpness, for example, block copying materials.

The inventors have examined the causes therefor by electron microscope to find that all of the nucleus particles participate in transfer development in image receiving materials which have different concentrations of nucleus particles per unit area and that the silver particles formed around one nucleus particle are bigger in receiving materials having low concentration of nucleus particles than in those having high concentration of nucleus particles. In other words, when the concentration of nucleus particles in water permeable colloid layer is increased, the optical density (especially transmission density) can be increased to some extent as compared with when the concentration of nucleus particles is low, with use of the same amount of transfer silver due to the small and compact transfer silver particles in the receiving materials of high nucleus particle concentration. However, participation of all nucleus particles in transfer development means that there is a waste of silver for optical density (especially reflective density).

That is, the above fact means that the three-dimensional distribution of nucleus particles in water permeable colloid layer results in high consumption of silver regardless of whether the concentration of nucleus particles is high or low and contribution of silver to optical density is not sufficient despite the much consumption of silver.

Under such background, it has been found that highly effective utilization of silver can be attained by two-dimensionally distributing all of the nucleus particles in a colloid layer which have been conventionally three-dimentionally dispersed in a colloid layer of a large amount and further that decrease in optical density is extremely small even when the amount of silver is extremely reduced. Such structure of nucleus particles has brought about the unexpected result that the obtained optical density in respect of the amount of silver halide used per unit area is much higher than that obtained by the conventional DTR process. It is easily supposed from the descriptions hereinbefore that such result is obtained because from one silver halide particle a soluble silver complex salt diffuses to many nucleus particles which are close to each other to effectively form continuous silver particles. Furthermore, in the mono-sheet type materials, because of the small amount of silver the density of silver images chemically developed in silver halide emulsion layer is extremely low and so images of higher contrast can be obtained.

In a modified embodiment of mono-sheet type materials, images of further higher contrast can be obtained as explained hereinafter and this provides another merit.

The water permeable colloid is necessary for varius reasons such as for permeating sufficient amounts of developing agents, silver halide solvent, alkali agents, etc. which participate in transfer development, for obtaining purely black silver images by preventing formation mirror like transfer silver images, for preventing mechanical abrasion of nucleus particles, etc.

In addition to the reasons as enumerated above, further reasons for using the covering colloid are for preventing reduction of transfer development efficiency liable to occur due to the single layer of the nucleus particles and/or small amount of silver, e.g., reduction of concentration of soluble silver complex salt near the nucleus particles caused by diffusion of the soluble silver complex salt into developing solution and for preventing unevenness of transfer development, e.g., the so-called uneven development which occurs in transfer developed parts due to conditions of agitation, etc.

Figure 2:
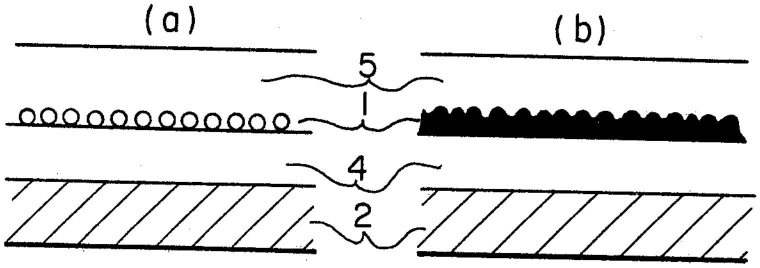
Figure 3:
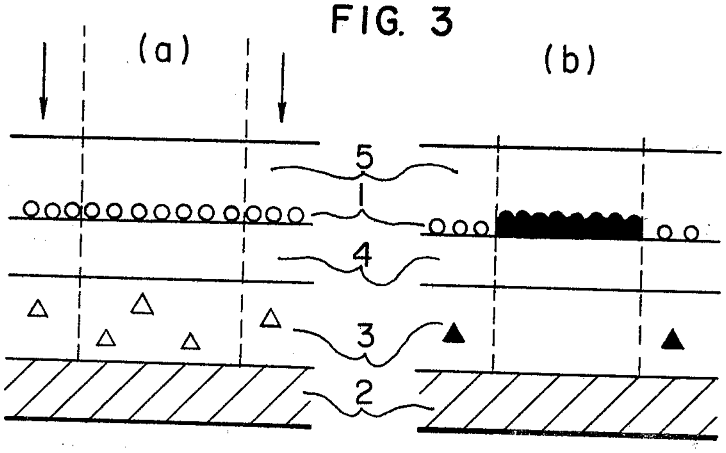

FIG. 1, FIG. 2 and FIG. 3 diagrammatically illustrate a conventional image receiving material for two-sheet type materials, an image receiving material for two-sheet type materials according to this invention and a mono-sheet type material according to this invention, respectively. In these Figures, 1 indicates a nucleus particle layer, 2 indicates a support, 3 indicates a silver halide emulsion layer, 4 indicates an undercoat layer or intermediate layer which may not be present and 5 indicates a covering colloid layer and "O" means nucleus particles, "•" and "▲▲" mean transfer silver, "Δ" means silver halide and "▲" means developed silver. Furthermore, in each Figure, (a) shows the state before formation of images and (b) shows the state after formation of images. As the nucleus particles, known ones such as noble metals and metal sulfides as enumerated before may be used. Average diameter of the nucleus particles may be 10–500 Å, preferably 10–200 Å. It is necessary that the distance between the particles is less than the distance required for the transfer developed silver becoming one continuous light intercepting layer. This distance depends on many factors, but may be less than 50 times, preferably less than 20 times the average particle diameter.

The nucleus particles in (a) of FIG. 2 and (a) of FIG. 3 are present on the surface of undercoat layer or intermediate layer, but layer 4 may not especially be present. However, the effects of this invention cannot be attained and the above-mentioned defects occur unless the nucleus particles are covered with an outer water permeable colloid layer of a thickness at least 10 times, preferably at least 50 times the average particle diameter.

The nucleus particles in the case of mono-sheet type materials may also be arranged between a silver halide emulsion layer and a support. In this case, the silver halide emulsion layer may serve as the colloid layer for covering the nucleus particles or another non-light sensitive colloid layer may cover the nucleus particles.

In arranging nucleus particles between support and silver halide emulsion layer, the emulsion layer may not be completely hardened or only hardened to such extent as being able to be easily washed-off by running water to obtain images of high contrast and high sharpness in mono-sheet by removing the silver halide emulsion layer after development. Furthermore, silver can easily be recovered from the emulsion removed.

The structure of nucleus particles of this invention can be easily produced by coating hydrosol of physical development nucleus particles which contains substantially no organic macromolecular colloid which is generally called binder. The amount of this organic macromolecular colloid can actually be zero, but a small amount of protective colloid may be used for keeping dispersion stability, etc. of the physical development nucleus particles. However, as is clear from the explanation previously given, the amount of such protective colloid should not be such that silver particles after developed are three-dimensionally distributed due to the thickness of the protective colloid.

The term "substantially two-dimensional distribution" used here means that the nucleus particles are distributed so that the formed transfer silver can become a continuous single layer, preferably distributed as a single nucleus particle layer with none of the nucleus particles being in the form of piles. Presence of some nucleus particles distributed in undesired form which might be produced under some production conditions should be ignored as long as the particles are basically in a single layer.

Furthermore, the term "substantially two-dimensional distribution" also includes three-dimensional arrangement of nucleus particles which is brought about, for example, due to roughness and unevenness of support of undercoat layer.

The weight of nucleus particles per 1 $m^2$ is determined depending on the kind of nuclei, namely, specific gravity and size of the nucleus particles and can be easily calculated from the explanations given hereinbefore.

Preferred method for making substantially two-dimensional distribution of physical development nucleus particles is coating of hydrosol nucleus particle as mentioned hereinbefore. There are other methods, e.g., vacuum evaporation method and a method comprising supplying separately, e.g., a liquid containing metal salt and a liquid containing sulfide and forming physical development nuclei at the contact interface. However, the former has difficulty at industrial aspect and the latter is difficult in control.

The undercoat layer in two-sheet type can be provided at any thickness and can have various functions depending on purposes. It is not necessarily water permeable.

The water permeable colloid which covers nucleus particles has a thickness of at least 10 times, preferably at least 50 times the average diameter of the nucleus particles and is about 0.1–10μ, preferably about 0.3–5μ.

In the case of two-sheet type materials, a known peeling layer may be additionally provided on the covering colloid to further improve transfer efficiency.

In the case of the mono-sheet type materials as shown in FIG. 3, an intermediate layer containing a white pigment can be provided preferably between layer 1 and layer 3 to mask the silver images formed in layer 3 whereby images of high contrast suitable as reflective materials can be obtained.

The silver halide emulsions used in this invention comprise, e.g., silver chloride, silver bromide, silver chlorobromide and these silver halides containing iodides. Preferred are fine particles of 0.5μ or less in average particle size. Binders are desirably used at a weight ratio of 0.3–5.0, preferably 0.3–3.0 per silver halide.

The silver halide emulsions can be sensitized at the time of preparation or coating by various methods. For example, they may be chemically sensitized by various methods well known in this field, e.g. with sodium thiosulfate, alkylthiourea or gold compounds such as gold rhodanate, gold chloride or their combination. Usually, the emulsions are further sensitized for the range of about 530—about 560 nm, but may also be panchromatically sensitized.

Silver halide emulsion layers, physical development nuclei containing layers, peeling layers, intermediate layers, undercoat layers, etc. may contain optional compounds which are usually employed in the practice of DTR for improving shelf stability, color tone, etc. Examples of these compounds are antifoggants and color toning agents such as tetrazinedenes, mercaptotetrazoles, etc., coating assistants such as saponin, polyalkylene oxides, etc., hardeners such as formalin, chrome alum, plasticizers, etc. Furthermore, inorganic particles such as colloidal silica, clay, barium sulfate, etc. may be added.

The supports may comprise any of the various types which are usually employed, for example, papers, glass, films such as cellulose acetate film, polyvinyl acetal film, polystyrene film, polyethylene terephthalate film, etc., metallic supports both sides of which are coated with paper, paper supports one or both sides of which are coated with α-olefin polymers such as polyethylene.

Transfer silver formed at nucleus particles is preferably of pure black for reflective materials having opaque supports while there is no special limit in the color for transmissive materials having transparent supports such as film.

Generally, the processing solutions used in the DTR process contain alkaline substances, e.g., sodium hydroxide, potassium hydroxide, lithium hydroxide, trisodium phosphate, etc., preservatives, e.g., sodium sulfite, etc., thickening agents, e.g., carboxymethylcellulose, hydroxyethylcellulose, etc., anti-foggants, e.g., potassium bromide, etc., silver halide solvents, e.g., sodium thiosulfate, etc., color toning agents, e.g., 1-phenyl-5-mercapto-tetrazole, etc., development modifiers, e.g., polyoxyalkylene compounds, onium compounds, etc., and if necessary, developing agents, e.g., hydroquinone, 1-phenyl-3-pyrazolidone, etc.

The pH of the processing solutions is that for activating developing agents, generally about 10–14, preferably about 12–14. The optimum pH for a certain DTR process may vary depending on photographic elements used, desired images, kind and amount of the compounds used in the processing solutions, processing conditions, etc.

In the practice of the DTR process, the developing agents are generally contained in light sensitive silver halide emulsion layer and/or image receiving layer or other water permeable colloid layer contiguous thereto as described in British Pat. Nos. 1,000,115, 1,012,476 and 1,093,177. Therefore, the processing solutions used at developing stage can be the so-called alkaline activating solution containing no developing agents.

In this invention the alkaline activating processing solution compositions are preferred.

The processing solution compositions used in this invention may contain other additives generally used in DTR processing solution besides the various compounds enumerated above.

The following Examples illustrate this invention.

EXAMPLE 1

On a both sides polyethylene coated paper support having a gelatin undercoat layer of 0.5 g/$m^2$ and subjected to corona discharge treatment was coated a hydrosol solution containing nickel sulfide nuclei of about 60 Å in average particles diameter and gelatin in an amount of 50% by weight of said nuclei by dipping method and this was dried. A gelatin layer of 2 g/$m^2$ was provided thereon to obtain positive material A. For comparison, on the same support as used above was coated a gelatin solution in which nickel sulfide nuclei in the same amount as in positive material A were dispersed in a thickness of 2 g/$m^2$ to obtain positive material B. It was confirmed by an electron microscope that the nucleus particles were two-dimentionally distributed with distance between the particles being about 200 Å.

Separately, on the same support as used for the positive materials was provided a gelatin undercoat layer (gelatin 3 g/$m^2$) containing carbon black as a halation inhibitor and 1 g/$m^2$ of hydroquinone and 0.3 g/$m^2$ of 1-phenyl-4-methyl-3-pyrazolidone and thereon was provided a orthochromatically sensitized gelatin silver halide emulsion layer (gelatin 1 g/$m^2$) containing silver chlorobromide (silver bromide 15 mole %) having an average particle diameter of 0.3μ in an amount of 0.3 $g/m^2$ and 1.0 $g/m^2$ in terms of silver nitrate and 0.2 $g/m^2$ of hydroquinone, etc. to obtain negative materials.

The emulsion surface of said negative materials which was imagewise exposed was brought into contact with the image receiving surface of said positive materials A and B.

Then, these were allowed to pass through the usual developing device having the following DTR processing solution (20° C.) and after lapse of 30 seconds both materials were separated from each other.

| | |
|---|---|
| Water | 800 ml |
| Sodium sulfite (anhydrous) | 30 g |
| Potassium sulfite (anhydrous) | 10 g |
| Trisodium phosphate (12 $H_2O$) | 75 g |
| Sodium hydroxide | 5 g |
| Sodium thiosulfate (5 $H_2O$) | 20 g |
| Potassium bromide | 1 g |
| 1-phenyl-5-mercapto-tetrazole | 0.1 g |
| Water to made 1 l | |

Thus obtained optical reflective density is shown in Table 1.

TABLE 1

| Silver nitrate of negative ($g/m^2$) | Positive material A | Positive material B |
|---|---|---|
| 1.0 | 1.56 | 1.44 |
| 0.3 | 1.41 | 0.90 |

It is recognized from Table 1 that the positive material A of this invention was higher than positive material B in density, contrast and sharpness and furthermore reduction of density with decrease in the amount of silver was small in the positive material A.

EXAMPLE 2

On a transparent undercoated polyester film was provided an orthochromatically sensitized silver halide emulsion layer (gelatin 1.5 $g/m^2$) containing 0.2 $g/m^2$ (in terms of silver nitrate) of silver chloride (0.2μ) and thereon was provided each of the same nucleus particle layers as used in positive materials A and B in Example 1 in the same manner as in Example 1. Thus obtained samples were called mono-sheet A and mono-sheet B, respectively.

These samples were imagewise exposed and then were subjected to diffusion development with the developing solution used in Example 1 to which 10 g/l of hydroquinone and 1 g/l of 1-phenyl-3-pyrazolidone were added to obtain the results as shown in Table 2.

TABLE 2

| | $D_{max}$* | $D_{min}$* |
|---|---|---|
| Mono-sheet A (this invention) | 1.6 | 0.2 |
| Mono-sheet B (comparison) | 0.9 | 0.2 |

*In Table 2, $D_{max}$ shows transmission density of diffusion transfer silver (positive image) and $D_{min}$ shows transmission density of silver (negative image) formed in silver halide emulsion layer.

EXAMPLE 3

On a polyethylene coated paper support was provided an orthochromatically senstized silver halide emulsion layer (gelatin 1.5 $g/m^2$) containing silver bromide (0.4μ) in an amount of 0.2 $g/m^2$ in terms of silver nitrate and thereon was provided the nucleus particle layer used in positve material A and positive material B in Example 1. Thus obtained samples were called mono-sheet A' and mono-sheet B', respectively. Thereafter, these samples were exposed and developed in the same manner as in Example 2 and the reflective density of positive image (Dmax) and that of negative image (Dmin) were measured to obtain the results as shown in Table 3.

TABLE 3

| | $D_{max}$ | $D_{min}$ |
|---|---|---|
| Mono-sheet A' | 1.3 | 0.2 |
| Mono-sheet B' | 0.6 | 0.2 |

Said Dmin could be reduced by providing a gelatin thin layer containing a slight amount of titanium dioxide between the nucleus particle layer and the emulsion layer.

What we claim:

1. A photographic material free from silver halide emulsion layer for use in silver complex diffusion transfer process which comprises a support having thereon at least a non-light sensitive water permeable colloid layer containing physical development nucleus particles, wherein all of the physical development nucleus particles are covered with a non-light sensitive water permeable colloid having a thickness of at least 10 times the average diameter of the nucleus particles and all of the physical development nucleus particles are substantially two-dimensionally distributed at such intervals as capable of forming a continuous transfer developed silver.

2. A photographic material for use in silver complex diffusion transfer process which comprises a support having thereon a non-light sensitive water permeable colloid layer containing physical development nucleus particles and a silver halide emulsion layer between the support and the nuclei, wherein all of the physical development nucleus particles are covered with a non-light sensitive water permeable colloid having a thickness of at least 10 times the average diameter of the nucleus particles and all of the physical development nucleus particles are substantially two-dimensionally distributed at such intervals as capable of forming a continuous transfer developed silver.

3. A photographic material according to claim 1 or 2, wherein the physical development nucleus particles are noble metals or metal sulfides.

4. A photographic material according to claim 1 or 2, wherein the average diameter of the nucleus particles is about 10–500 Å.

5. A photograhic material according to claim 4, wherein the average diameter of the nucleus particles is about 10–200 Å.

6. A photographic material according to claim 1 or 2, wherein the interval between the nucleus particles is less than about 50 times the average diameter of the nucleus particles.

7. A photographic material according to claim 6, wherein the interval is less than about 20 times the average diameter of the nucleus particles.

8. A photographic material according to claim 1 or 2, wherein the thickness of the non-light sensitive water permeable colloid which covers the physical development nucleus particles is at least 50 times the average diameter of the nucleus particles.

9. A photographic material according to claim 1, wherein a peeling layer is provided on the covering colloid.

10. A photographic material according to claim 1, wherein an undercoat layer is provided between the support and the nucleus particle layer.

11. A photographic material according to claim 2, wherein an intermediate layer containing a white pigment is provided between the physical development nucleus particle layer and the silver halide emulsion layer.

12. A photographic material according to claim 2, wherein the silver halide emulsion layer contains up to 4 millimols/m$^2$ of silver.

13. A process of forming an image comprising:

imagewise-exposing a light sensitive material comprising a support and silver halide emulsion layer which is in contact with a non-light sensitive water permeable colloid layer at the time of development with a processing solution and then developing the light sensitive material with a processing solution, wherein the silver halide emulsion layer contains up to 4 millimols/m$^2$ of silver and is present between the support and the nuclei, all of the physical development nucleus particles are covered with a non-light sensitive water permeable colloid having a thickness of at least 10 times the average diameter of the nucleus particles and all of the physical development nucleus particles are substantially two-dimensionally distributed at such intervals as capable of forming a continuous transfer developed silver.

* * * * *